March 10, 1964 E. G. WESTMAN 3,123,881
LINE ATTACHING DEVICE

Filed Sept. 29, 1961 2 Sheets-Sheet 1

INVENTOR.
EYTHOR G. WESTMAN
BY Barnes + Seed
ATTORNEYS

March 10, 1964 E. G. WESTMAN 3,123,881
LINE ATTACHING DEVICE
Filed Sept. 29, 1961 2 Sheets-Sheet 2
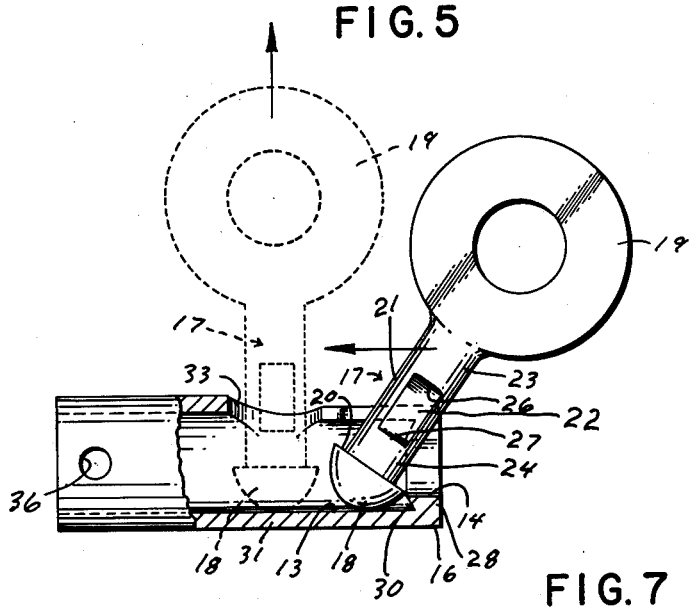
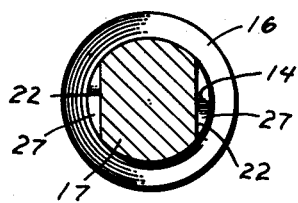
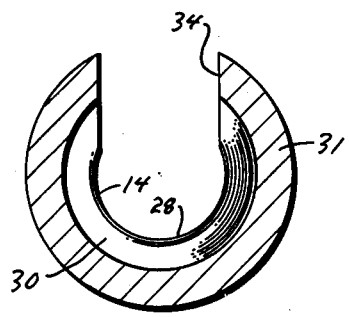
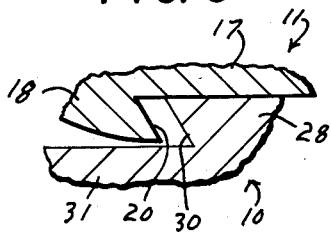
INVENTOR.
EYTHOR G. WESTMAN
BY *Burns & Seed*
ATTORNEYS

United States Patent Office 3,123,881
Patented Mar. 10, 1964

3,123,881
LINE ATTACHING DEVICE
Eythor G. Westman, Rte. 2, Blaine, Wash.
Filed Sept. 29, 1961, Ser. No. 141,707
5 Claims. (Cl. 24—222)

This invention relates to a line hooking device adapted for use in commercial fishing and more particularly to such a hooking device of a ferrule and socket type.

In the operation of a commercial fishing vessel, it is very desirable to have a fast and reliable means of hooking and unhooking lines, which means precludes the accidental release of the lines. This applies to both gillnetting and purse seining, as well as trawling operations.

In purse seining, the purse line is the line which is strung through the rings on the bottom portion of the net. By pulling in the purse line with the vessel's winch, the rings and net are drawn in a pursing fashion, thereby closing up the bottom of the net and preventing the fish from escaping. When the pursing process is completed, the rings are lifted on deck and the purse line is removed by unhooking the line.

In gillnetting, the gillnet is laid out behind the boat and is connected to the boat with a line. The fisherman, as he gathers his fish, must disconnect the boat from the net and work his way back along the cork line of the net, lifting the net and picking out the fish. In trawling there is a like necessity of hooking and unhooking the lines which extend rearwardly from the vessel.

The prior art methods of attaching the lines commonly use either a shackle or a "figure 8." It is especially time consuming and cumbersome to release or engage a line by use of a shackle since a wrench is commonly needed. The "figure 8" does not require as much time for release, but when any large quantity of line is involved, this operation requires two men. Also both the shackle and the "figure 8" must either be tied or wired in some manner if accidental unhooking is to be prevented. Another consideration is that the "figure 8" sometimes becomes bent, which makes the release of the line especially difficult. Since commercial fishermen (salmon and trawler fishermen especially) often operate under adverse weather conditions, quick and reliable release mechanisms are especially important to prevent unnecessarily endangering the boat, if, for example, a storm should suddenly arise.

Another consideration is that neither the shackle nor the "figure 8" allow for twisting of the line. Because of this a swivel must often be used in addition to the attaching device to prevent such twisting from fouling the line.

In view of these aforementioned difficulties, it is the general object of my invention to provide a line connecting device which one man may quickly and easily either engage or release, which, when engaged, remains reliably secured with no practical possibility of accidental release, and which allows a swivel movement of the line to prevent twisting thereof.

It is also an object to accomplish the several advantages of the aforementioned object and yet provide a device which is sturdy and durable so as to withstand the rigors of weather and hard use, such as those experienced in shipboard use.

It is a more particular object to insure the reliable securing of the line without any auxiliary operation such as tying or wiring.

It is a further particular object to so arrange the connecting device that the motion required either to secure or release the line is a relatively simple and easily performed manual operation, and yet to arrange the device so that the particular location and position of the parts of the device which allow the disengagement thereof are such as to preclude the practical possibility of accidental disengagement. Yet another particular object is to arrange the ferrule and socket of this device so as to eliminate any tendency to expand the mouth of the socket, and in fact to so arrange the device that added pull on the line acts to make the device hold more strongly by increasing the grip of the socket member on the ferrule.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 5 is a view similar to that of FIG. 4, in which a ferruled member is shown in full lines in a position in which it may be slid rearwardly in the socket member, and in which the ferruled member is shown in broken line, in a position where it may be removed from the socket member;

FIG. 6 is a longitudinal sectional view taken on line 6—6 of FIG. 2;

FIG. 7 is a longitudinal sectional view taken on line 7—7 of FIG. 3; and

FIG. 8 is a fragmentary sectional view, detailing a portion of the shoulder of the ferrule and the shoulder of the mouth of the socket, so as to illustrate the slope of the engaging surfaces of the ferruled member and the socket member.

Figure 1:
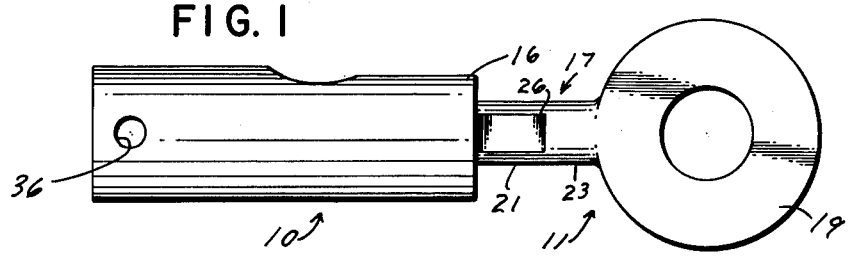
FIGURE 1 is a side elevational view of a line hooking device embodying preferred teachings of my invention, in which a ferruled member is shown in full engagement with a socket member.

Referring to the accompanying drawings, numeral 10 indicates a body member, which is adapted to connect to a ferrule carrying member, designated 11. The body member has a socket 13 which has its opening 14 at the front or nose portion 16 of the body. The member 11 comprises a shank 17 having at its rear end an enlargement or ferrule 18 and at its forward end an eye portion 19. In engaged position, the ferrule 18 fits within the socket 13 with the shank extending through the front socket opening 14.

To describe the ferruled member 11 more particularly, the ferrule itself 18 is generally hemispherical, with the shank 17 extending outwardly from the center of, and at right angles to, the plane surface of the hemisphere. Since the diameter of the shank is moderately less than the diameter of the ferrule, there is formed along the perimeter of the ferrule's plane surface portion an annular shoulder 20.

The shank 18 may be described as being generally cylindrical, with the exception that at the middle portion 21, opposite sides of the shank are cut out to form two parallel flat surface portions 22—22. The cylindrical front and rear shank portions, 23 and 24, each present at the juncture point with the middle shank portion 21 two pairs of diametrically opposed shoulders, 26—26 and 27—27 respectively, each shoulder facing longitudinally toward the middle portion of the shank.

Proceeding now to a more detailed description of the body member 10, the socket 13 is shaped as a longitudinally extending bore of a uniform diameter slightly larger than that of the ferrule 18. At the front or mouth end of the socket is an inwardly facing annular lip 28 which defines the circular front opening or mouth 14 of the socket. The diameter of the opening 14 is slightly larger than that of the shank 17 so as to allow the shank to extend outwardly through this opening. The lip 28 presents a rearwardly facing annular shoulder 30. This shoulder 30 and the ferrule shoulder 29 present matching surfaces which engage one another when the ferrule 18 is positioned within, and is moved fully forward, in the socket 13. Referring now particularly to the showing of FIG. 8, it should be noted that the ferrule shoulder 29 is undercut to form a generally annular concave surface, and that the shoulder 30 is also undercut to form a matching surface which may be described as convex. The effect of this is that when the members 10 and 11 are engaged and the ferrule 18 is pulled against the lip 28 of the socket 13, the shoulder 29 exerts a force component on the lip 28 directed radially inward, thus preventing any expansion of the socket opening 14, and in fact tending to draw the lip together.

Cut through the cylindrical side wall 31 of the member 10, which wall defines the socket 13, is a key hole opening 32. This opening comprises a circular transverse opening 33 that leads to the base of the socket 13, and a longitudinal through slot 34 which extends from the opening 33 to the mouth 14 of the socket. The diameter of the circular opening 33 is slightly larger than that of the ferrule 18, and the width of the slot 34 is less than the diameter of the shank 17, but slightly more than the distance between the flattened shank side faces 22—22.

Rearward of the key opening 32 is a line attaching means which desirably is comprised of two aligned transverse through holes 36, each extending through a related side wall portion of the body member 10. Regarding the construction of the rear portion of the body 10, for convenience of manufacture, as shown herein, the socket 13 is constructed as a through bore extending from the rear of the body to the lip 28. However, it is to be understood that in the operation of this device the socket 13 is considered functionally as extending forwardly from the location of the circular side opening 33, this location being the base of the socket.

Figure 2:
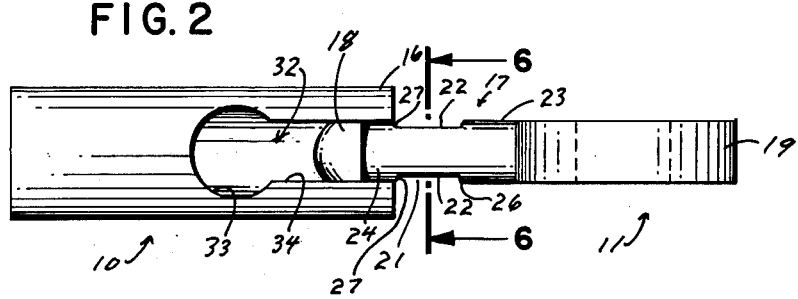
FIG. 2 is a top plan view of the device of FIG. 1.
Figure 4:
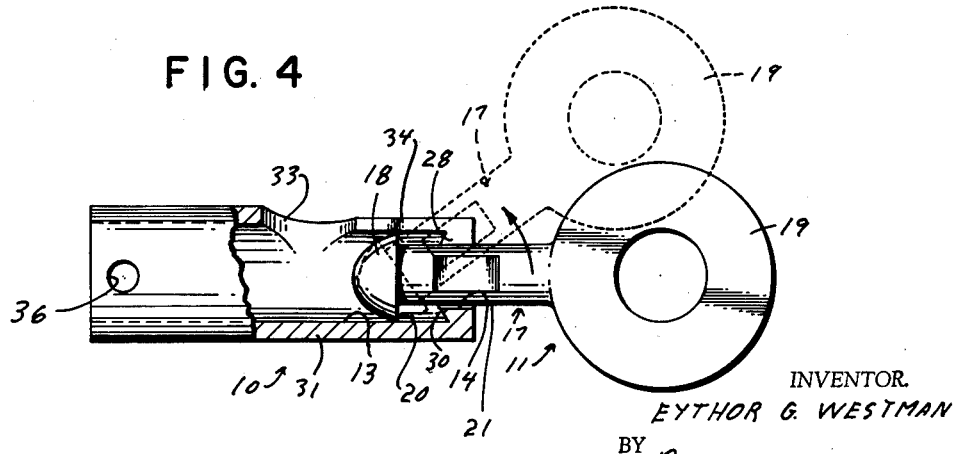
FIG. 4 is a side elevational view, partly in section, showing in full lines the ferruled member in a position to be disengaged from the socket member, and showing in broken lines the same ferruled member moved upwardly in a manner to begin the release of this member.

In operation a line or cable is either passed through the rear opening 36—36 of the body 11 or is secured to the ferruled member 11 through the eye 19, with the other member being attached in an appropriate manner to the vessel. Assuming now that the members 10 and 11 are engaged (as in the showing of FIGS. 1 and 2), with the shoulders 20 and 30 bearing against one another and the rear shank portion 24 extending through the mouth 14 of the socket 13, to disengage the members, it is necessary first to move the ferruled member 11 rearwardly a moderate distance so that the middle flattened shank portion 21 lies in the mouth 14 of the socket 13, this being the position shown in full lines of FIG. 4. Further the flattened shank surfaces 22—22 must be aligned parallel with a plane passing through the longitudinal axes of the socket 13 and the slot 34. Then the forward or eye portion of the member 11 is lifted as shown in the dotted lines of FIG. 4. When the member 11 is raised until it is at an angle of about 45° with the axis of the socket 13, which is approximately the position shown in full lines in FIG. 5, the member 11, being held at this angular position, is then moved rearwardly until the ferrule 18 is transversely aligned with the circular opening 33. At this location, the member 11 may be lifted at right angles to the axis of the socket (as in the broken line showing of FIG. 5), and lifted along a direction parallel to its own axis so as to be completely free of the socket member 10. To engage the members 10 and 11, the above disengaging operation is simply reversed.

Figure 3:
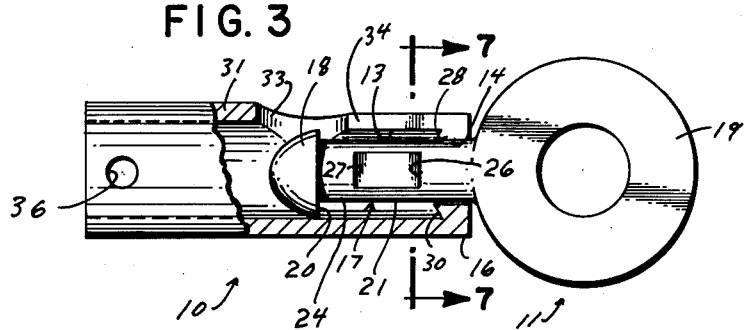
FIG. 3 is a side elevational view, partly in section, with the ferruled member pushed rearwardly into the socket member.

It should be noted that the distance from the center of the circular side opening 33 to the nose of the socket is greater than the distance from the radial point of the hemisphere of the ferrule 18 to the front shank shoulders 26—26. The reason for this arrangement is that if the member 11, when engaged, is pushed back so that the ferrule 18 is aligned iwth the opening 33 (which is the position shown in FIG. 3), the front shank portion 23 is then located in the socket opening 14. Since the slot 34 will pass only the flattened middle shank portion 21, the ferruled member 11 will not become disengaged in this position. To accomplish the disengaging of the members 10 and 11, it is necessary to locate the ferrule in the socket a moderate distance from the mouth 14 so that the flattened middle portion 21 of the shank is at the opening 14, and then the flat sides 22—22 of the shank must be in proper alignment with the slot 34. A device embodying the broad teachings of this invention could readily be adapted to sport fishing, thus allowing the fisherman to change gear with relative ease.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A line connecting device comprising a first member having a socket and a second rigid member having at its rear end a ferrule which is adapted to rotatably fit into said socket, each member being adapted to be attached to a related object, a rigid shank extending from said ferrule, and having a front portion, a middle portion of reduced width and a rear portion, said socket having a restricted front opening which is able to pass the front and rear portions of said shank, said socket member having an access opening leading to said socket and adapted to pass said ferrule, a through slot opening to said socket and leading from said access opening to said front opening, said slot adapted to pass only the middle reduced width portion of said shank so that when the ferrule is inserted into said access opening, the reduced width shank portion may be passed through said slot so that said shank may be made to extend through said front socket opening, thus coupling the two members.

2. The device as recited in claim 1, wherein said middle portion of said shank is so located with respect to said shank that when the ferrule is positioned to pass through said socket, said middle portion is located to the rear of said socket front opening, with the result that, in order to disengage said first and second members, the reduced width portion of said shank must be positioned in said socket front opening and passed rearwardly through said slot before said ferrule is able to pass through said access opening.

3. The device as recited in claim 1, wherein said reduced width portion comprises a flattened part of said shank, with the result that said second member must be rotated about the shank axis to the proper angular position before said reduced width portion is able to pass said slot.

4. The device as recited in claim 1, wherein said shank has attached to its front portion a line connecting means which is not able to pass through said socket front opening, so that when said shank is extending through said socket front opening and said second member is pushed rearwardly, the line connecting means prevents further rearward motion of said second member.

5. The device as recited in claim 1, wherein said reduced width portion comprises a flattened part of said shank, with the result that said second member must be rotated about the shank axis to the proper angular position before said reduced width portion is able to pass said slot.

References Cited in the file of this patent

UNITED STATES PATENTS

| | | |
|---|---|---|
| Re. 5,740 | Lamb | Jan. 27, 1874 |
| 534,165 | Lee | Feb. 12, 1895 |
| 831,445 | Kosmatka | Sept. 18, 1906 |
| 1,464,452 | Starck | Aug. 7, 1923 |
| 2,574,579 | McCoy et al. | Nov. 13, 1951 |

FOREIGN PATENTS

| 765,877 | Great Britain | Jan. 16, 1957 |
|---|---|---|